(12) United States Patent
Stek et al.

(10) Patent No.: US 7,110,336 B2
(45) Date of Patent: Sep. 19, 2006

(54) METHODS, OPTICAL RECORDING APPARATUS USING SUCH METHODS AND OPTICAL RECORDING MEDIUM FOR USE BY THE METHODS AND THE APPARATUS

(75) Inventors: Aalbert Stek, Eindhoven (NL); Johannes Hendrikus Maria Spruit, Eindhoven (NL); Cai Gang Xu, Eindhoven (NL); Joris Van De Pas, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 545 days.

(21) Appl. No.: 09/996,000

(22) Filed: Nov. 16, 2001

(65) Prior Publication Data

US 2002/0114235 A1    Aug. 22, 2002

(30) Foreign Application Priority Data

Nov. 17, 2000 (EP) .................................. 00204046
Nov. 28, 2000 (EP) .................................. 00125983

(51) Int. Cl.
*G11B 7/00* (2006.01)
(52) U.S. Cl. .................................................. 369/47.53
(58) Field of Classification Search ..................... None
See application file for complete search history.

(56) References Cited

U.S. PATENT DOCUMENTS 5,185,733 A * 2/1993 Finkelstein et al. ...... 369/47.52
5,226,027 A * 7/1993 Bakx ........................ 369/47.55
5,303,217 A * 4/1994 Bakx et al. ............... 369/47.53
5,341,360 A * 8/1994 Johann et al. ............ 369/47.53
5,418,764 A    5/1995 Roth et al. ..................... 369/32
5,654,947 A    8/1997 Roth et al. ..................... 369/48
5,740,149 A    4/1998 Iwasaki et al. ............. 369/116
5,761,179 A    6/1998 Iwasaki et al. ............. 369/116
5,793,737 A * 8/1998 Den Boef ................. 369/47.53
6,134,209 A * 10/2000 Den Boef ................. 369/47.53

FOREIGN PATENT DOCUMENTS

| EP | 0397238 | 11/1990 |
|---|---|---|
| EP | 0475558 A2 | 3/1992 |
| EP | 0737962 | 10/1996 |
| WO | WO9825266 | 6/1988 |

\* cited by examiner

*Primary Examiner*—Thang V. Tran
(74) *Attorney, Agent, or Firm*—Edward W. Goodman (57) ABSTRACT

In methods and an optical recording apparatus using these methods, an optimum write power of a radiation beam in the apparatus is set by writing a series of test patterns on the optical recording medium, forming a read signal from the patterns and processing the read signal. Such processing involves fitting a function, preferably a straight line, to parameters obtained from the read signal without having to perform a differentiation step.

21 Claims, 4 Drawing Sheets

FIG. 7

METHODS, OPTICAL RECORDING APPARATUS USING SUCH METHODS AND OPTICAL RECORDING MEDIUM FOR USE BY THE METHODS AND THE APPARATUS

BACKGROUND OF THE INVENTION

1. Field of the Invention

The invention relates to a method for setting an optimum value of a write parameter for use in an optical recording apparatus for writing information on an optical recording medium by means of a radiation beam, the method comprising writing a series of test patterns on the recording medium, each pattern being written with a different value of a write power level (P) of the radiation beam, reading the patterns so as to form corresponding read signal portions, and deriving a value of a read parameter from each read signal portion. The invention also relates to a method for setting an optimum value of the write power level of the radiation beam.

The invention also relates to an optical recording apparatus for recording information on an optical recording medium, said optical recording apparatus comprising a radiation source for emitting a radiation beam having a controllable value of a write power level for recording information on the recording medium, a control unit for recording a series of test patterns, each pattern being recorded with a different value of the write power level, a read unit for reading the patterns and forming corresponding read signal portions, and first means for deriving a value of a read parameter from each read signal portion.

The invention also relates to an optical recording medium onto which information may be recorded by irradiating the recording medium with a radiation beam, the recording medium comprising an area containing control information indicative of a recording process whereby information can be recorded on said recording medium, the control information comprising values of recording parameters for the recording process.

2. Description of the Related Art

A method and apparatus according to the first paragraph are known from the European Patent Application No. EP 0 737 962, corresponding to U.S. Pat. Nos. 5,740,149 and 5,761,179. The apparatus uses a method which includes the following steps for setting the optimum write power ($P_{opt}$) of the radiation beam. First, the apparatus records a series of test patterns on the recording medium, each pattern with increasing write power (P). Next, the apparatus derives the modulation (M) of each pattern from the read signal corresponding to the pattern. The apparatus calculates the derivative of the modulation (M) as a function of the write power (P) and normalizes the derivative by multiplying the derivative by the write power (P) over the modulation (M). The intersection of the normalized derivative ($\gamma$) with a preset value ($\gamma_{target}$) determines a target write power level ($P_{target}$). Finally, the target write power ($P_{target}$) is multiplied by a parameter ($\rho$) so as to obtain a write power level ($P_{opt}$) suitable for recording on the recording medium. The value of the parameter ($\rho$) is read from the recording medium itself. The test patterns are recorded on the recording medium by applying write power (P) values in a range around a given value ($P_{ind}$) which is also read from the recording medium itself.

In an optical recording apparatus, it is important to record information on optical recording media with the correct power of the laser beam. A media manufacturer cannot give this correct power in an absolute way (for example, prerecorded on the disc) because of environment and apparatus-to-apparatus deviations for every recording medium and recording apparatus combination. The known method for setting the optimum write power ($P_{opt}$) takes the different characteristics of the recording media into account by measuring the modulation (M) of the test patterns written on the recording media. Furthermore, this method is independent of the specific recording apparatus. The method is designed for providing a proper setting of the write power for each combination of recording apparatus and recording medium.

However, it is a disadvantage of the known method in that it is not always possible to determine an accurate and unambiguous value for the target write power level ($P_{target}$) and, therefore, for the optimum value ($P_{opt}$) of the write power level (P). This is because of the measurement noise introduced during the measurement of the values for the modulation (M) of each pattern. This measurement noise increases with decreasing write power (P) of the test patterns. It appears that even when the measured modulation values are averaged so as to reduce the measurement noise, sometimes a sort of plateau occurs in the $\gamma$-curve, thus preventing the determination of an unambiguous value for the target write power level ($P_{target}$).

SUMMARY OF THE INVENTION

It is an object of the present invention to provide a method according to the opening paragraph, which determines an accurate and unambiguous optimum value for a write parameter wherefrom an optimum value ($P_{opt}$) of the write power level (P) can be derived.

This object is achieved when the method set forth in the opening paragraph, is characterized in that the method also comprises curve-fitting a function defining a relation between the read parameter and the write power level (P) to the values of the read parameter and of the write power level (P), and setting an optimum value of the write parameter in dependence on a property of the curve-fitted function.

It should be noted that in the known method, the noise in the measurement of the read parameter is significantly amplified by the differentiation step necessary to obtain the normalized derivative ($\gamma$). In the method according to the invention, this differentiation step is omitted and a function is curve-fitted directly to the values of the read parameter versus the values of the write power level. This curve-fitting may be done by any fitting algorithm such as, for example, the well-known least-squares algorithm. An optimum value of the write parameter is obtained from this curve-fitted function.

Generally speaking, any function of arbitrary shape that defines a relation between the read parameter and the write power level (P) can be used. However, it should be noted that a straight line can be very easily and accurately curve-fitted. Therefore, arranging the values of the read parameter and of the write power level (P) in such a way that a straight line could be curve-fitted is advantageous and should be preferred.

In a version of the method according to the invention, the read parameter is a modulation (M) of the amplitude of a read signal derived from information recorded on the recording medium. This modulation (M) is computed from the following expression:

$$M=((I_H-I_L)/I_H)\times 100,$$

where $I_H$ is the highest level of the amplitude and $I_L$ is the lowest level of the amplitude in the read signal derived from reading information recorded on the information carrier comprising longer marks such as, for example, marks having a length of 14 times the channel bit length when Eight-to-Fourteen Modulation Plus (EFM+) coding is employed.

A preferred version of the method according to the invention is characterized in that the curve-fitted function is of the form:

$$P \cdot M = \alpha \cdot (P - \beta),$$

wherein $\alpha$ and $\beta$ have values resulting from the curve-fitting, and in that the optimum value of the write parameter is set to be substantially equal to the value of $\beta$.

When the values of the modulation (M) times the write power level (P) are plotted versus the write power level (P), a function represented by a substantially straight line can be curve-fitted. Physically, this straight line is limited by the lowest write power and the highest write power used when writing the series of test patterns. It is an advantage of this version of the method according to the invention, that a straight line can be very easily and accurately curve-fitted by way of known fitting algorithms.

The curve-fitted straight line is described by its properties $\alpha$ and $\beta$. The optimum value of the write parameter is set to be substantially equal to the value of $\beta$, i.e., the value for the power level (P) for which the extrapolated straight line crosses the P-axis. It is a further advantage of this version of the method according to the invention, that each straight line has just a single crossing with each of the axes. Therefore, the optimum value of the write parameter can unambiguously be determined because there is only a single crossing of the curve-fitted straight line with the P-axis.

A version of the method according to invention, is characterized in that the curve-fitting of the straight line is carried out in a predetermined fit range of write power levels. Because the curve fitted straight line is a first order approximation of the relation between the read parameter and the write power level, the curve-fit should be carried out in an appropriate fit range of write power levels.

Such an appropriate fit range is, for example, a range of write power levels around an indicative power level ($P_{ind}$) recorded on the recording medium as control information indicative of the recording process, for example, a range between $\omega_1 \cdot P_{ind}$ and $\omega_2 \cdot P_{ind}$ where $\omega_1$ and $\omega_2$ are predetermined values. An especially advantageous fit range is found to be a range of write power levels between $0.85 \cdot P_{ind}$ and $1.15 \cdot P_{ind}$.

A preferred method according to the invention is characterized in that the method also comprises curve-fitting a provisional straight line, and in that the predetermined fit range of write power levels is in-between $P_{fit} \cdot \omega_1$ and $P_{fit} \cdot \omega_2$, where $P_{fit}$ is a value derived from the provisional curve-fitted straight line. $\omega_1$ and $\omega_2$ may have any value. However, an especially advantageous fit range is found to be a range of write power levels in-between $0.85 \cdot P_{fit}$ and $1.15 \cdot P_{fit}$.

It should be noted that the provisional curve-fitted straight line itself can be obtained by curve-fitting it in a fit-range of power levels around a second value of $P_{fit}$ that is derived from a second provisional curve-fitted straight line. In this way, an iteration procedure can be created yielding an optimum fit range of power levels. Such an iteration procedure can start, for example, with a value of $P_{fit}$ equal to the indicative power level ($P_{ind}$) recorded on the recording medium as control information indicative of the recording process. The iteration procedure can stop, for example, after a predetermined number of iteration steps or, alternatively, when $P_{fit}$ changes less than a predetermined value between two consecutive iteration steps. It should also be noted that when an iteration procedure is used, $P_{fit}$ can be derived from the provisional straight line curve-fitted in the previous iteration step only. Alternatively, $P_{fit}$ can be derived from the provisional straight line curve-fitted in the previous iteration step in combination with at least one provisional straight lines curve-fitted in earlier iteration steps.

A further method according to the invention is characterized in that the method also comprises a step of curve-fitting at least a second straight line in at least a second predetermined fit range of write power levels, and in that the optimum value of the write parameter is set in dependence on a property of each of the curve-fitted straight lines. The optimum value of the write parameter may, for example, be set to the mean value of the optimum values resulting from each individual curve-fitted straight line. Alternatively, a weighted mean value can be used, or a value resulting from an interpolation procedure between the optimum values resulting from each individual curve-fitted straight line. Such an interpolation procedure may be either linear or non-linear. When two straight lines are used, the first fit range of write power levels can, for example, be set to a range around the indicative power level ($P_{ind}$) minus a fixed value, while the second fit range is set to a range around the indicative power level ($P_{ind}$) plus the fixed value. The fixed value may be selected, for example, from a range of between 0.25 mW and 1.0 mW.

It is also an object of the present invention to provide a method, according to the opening paragraph, which determines an accurate and unambiguous optimum value ($P_{opt}$) of the write power level (P) of the radiation beam. The optimum value ($P_{opt}$) of the write power level (P) is defined as the write power (P) for which the lowest jitter of the read signal from information recorded on the recording medium is obtained.

This object is achieved when the method set forth in the opening paragraph, the radiation beam having a write power level, is characterized in that the curve-fitted function is of the form $$P \cdot M = \alpha \cdot (P - \beta),$$

wherein $\alpha$ and $\alpha$ have values resulting from the curve-fitting, the optimum value of the write parameter is set to be substantially equal to the value of $\alpha$, and the optimal value ($P_{opt}$) of the write power level (P) of the radiation beam is set to be equal to the optimum value of the write parameter times a multiplication constant ($\kappa$).

After the optimum value of the write parameter has been determined, i.e., set to be substantially equal to the value of $\beta$, an optimum value ($P_{opt}$) of the write power level (P) of the radiation beam is obtained by multiplying the optimum value of the write parameter by a multiplication constant ($\kappa$). Thus, an optimal value ($P_{opt}$) of the write power level (P) is found from:

$$P_{opt} = \kappa \cdot \beta$$

The value of the multiplication constant ($\kappa$) depends on properties of the recording medium on which information is to be recorded. It should be noted that the value for the multiplication constant ($\kappa$) can be derived from the values for the parameter ($\rho$) and for the preset value ($\gamma_{target}$) of the known method by the formula $\kappa = \rho \cdot (1 + 1/\gamma_{target})$.

A version of the method according to the invention is characterized in that the multiplication constant ($\kappa$) is read from an area on the recording medium containing control information indicative of a recording process whereby information can be recorded on said recording medium.

Because the value of the multiplication constant (κ) depends solely on properties of the recording medium, it can be determined by the manufacturer and pre-recorded on the recording medium during manufacture. Alternatively, the value of the multiplication constant (κ) can be determined by the user and recorded on the recording medium for later use. According to the method, the value of the multiplication constant (κ) is then read from the recording medium when an optimum value ($P_{opt}$) of the write power level (P) has to be set for recording information on that recording medium.

It is a further object of the present invention to provide an apparatus, according to the opening paragraph, which determines an accurate and unambiguous optimum value for a write parameter wherefrom an optimum value ($P_{opt}$) of the write power level (P) can be derived.

This object is achieved when the apparatus set forth in the opening paragraph is characterized in that the apparatus further comprises second means for curve-fitting a function defining a relation between the read parameter and the write power level (P) to the values of the read parameter and of the write power level (P), and third means for setting an optimum value of a write parameter in dependence on a property of the curve-fitted function.

An embodiment of the apparatus according to the invention is characterized in that the second means are arranged for curve-fitting a function represented by a substantially straight line to the values of the read parameter and of the write power level (P).

An embodiment of the apparatus according to the invention is characterized in that the read parameter is a modulation (M) of the amplitude of a read signal derived from information recorded on the recording medium, and in that the curve-fitted function is of the form:

$$P \cdot M = \alpha \cdot (P - \beta),$$

wherein α and β have values resulting from the curve-fitting. In a preferred embodiment of the apparatus according to the invention, the optimum value of the write parameter is subsequently set to be substantially equal to the value of β.

An embodiment of the apparatus according to the invention is characterized in that the second means for curve-fitting a function is arranged for setting a predetermined fit range of power levels. The predetermined fit range may be set in dependence on a value ($P_{ind}$) indicative of the fit range read from an area on the recording medium comprising control information indicative of the recording process, for example, a range of between $\omega_1 \cdot P_{ind}$ and $\omega_2 \cdot P_{ind}$ where $\omega_1$ and $\omega_2$ are predetermined values. An especially advantageous fit range is found to be a range of write power levels between $0.85 \cdot P_{ind}$ and $1.15 \cdot P_{ind}$.

An embodiment of the apparatus according to the invention is characterized in that the apparatus comprises fourth means for curve-fitting a provisional straight line to the values of the read parameter and of the write power level (P), and fifth means for setting a value $P_{fit}$ in dependence on a property of the curve-fitted provisional straight line, and in that the second means (101) is arranged for setting the predetermined fit range of power levels between $P_{fit}$ times $\omega_1$ and $P_{fit}$ times $\omega_2$, where $\omega_1$ and $\omega_2$ are predetermined values. It is to be noted that the provisional curve-fitted straight line itself can be obtained from curve-fitting it in a fit range of power levels around a second value of $P_{fit}$ derived from a second provisional curve-fitted straight line. In this way, an iteration procedure can be created which results in an optimum fit range of power levels. It is also to be noted that the second means for curve-fitting the straight line and the fourth means for curve-fitting the provisional straight line may be separate devices or, alternatively, may be combined into a single device.

An embodiment of the apparatus according to the invention is characterized in that the apparatus comprises fourth means for curve-fitting a second straight line in a second predetermined fit range of power levels, and in that the third means (102) is arranged for setting an optimum value of the write parameter in dependence on a property of each of the curve-fitted straight lines. Again, the second means for curve-fitting the straight line and the fourth means for curve-fitting the second straight line may be separate devices or, alternatively, may be combined into a single device.

An embodiment of the apparatus according to the invention is characterized in that the apparatus comprises setting means for setting an optimum value ($P_{opt}$) of the write power level (P) in dependence on the optimum value of the write parameter.

An embodiment of the apparatus according to the invention, wherein the read unit is operative to read a value of a multiplication constant (κ) from an area on the recording medium containing control information indicative of a recording process whereby information can be recorded on said recording medium, is characterized in that the setting means is arranged for setting an optimum value ($P_{opt}$) of the write power level (P) by multiplying the optimum value of a write parameter by the multiplication constant (κ).

It is a further object of the present invention to provide an optical recording medium for use by the method and the optical recording apparatus of the present invention.

This object is achieved when the optical recording medium, set forth in the opening paragraph, is characterized in that the control information comprises a value of a multiplication constant (κ).

Because the value of the multiplication constant (κ), used by the method and the apparatus for setting the optimum value ($P_{opt}$) of the write power level (P), depends solely on properties of the recording medium, it can be determined by the manufacturer and pre-recorded on the recording medium during manufacture.

It should be noted that an optical recording medium is known from International Patent Application No. WO 98/25266, corresponding to U.S. Pat. No. 5,793,737. However, the control information contained on this known recording medium comprises a preset value ($\gamma_{target}$) which, in the known method and apparatus for setting an optimum value for a write parameter, is compared with the values of the normalized derivative (γ) of the modulation (M) versus the write power (P). The optical recording medium according to the present invention comprises a multiplication constant (κ) which is used to obtain an optimum value ($P_{opt}$) of the write power level (P) by multiplying this multiplication constant (κ) by the optimum value of a write parameter. Furthermore, this optimum value of a write parameter is derived without using a derivative of the modulation (M) versus the write power (P).

This object is also achieved when the optical recording medium of the opening paragraph is characterized in that the control information comprises a value indicative of the fit range ($P_{ind}$)·$P_{ind}$ can be determined by the manufacturer and pre-recorded on the recording medium during manufacture. For determining $P_{ind}$, media manufacturers have to find the optimum value ($P_{REF}$) of the write power level (P) for their recording medium in a reference recording apparatus and under standardized conditions. Now, $P_{ind}$ can be derived, for example, from $P_{REF}$ from either of the formulas:

$P_{ind} = P_{REF}/\rho$, or $P_{ind} = (P_{REF}/\kappa) \cdot (1 + 1/\gamma_{target})$.

BRIEF DESCRIPTION OF THE DRAWINGS

The objects, features and advantages of the invention will be apparent from the following more specific descriptions of examples of embodiments of the invention, as illustrated in the accompanying drawings in which.

DESCRIPTION OF THE PREFERRED EMBODIMENTS

Figure 1:
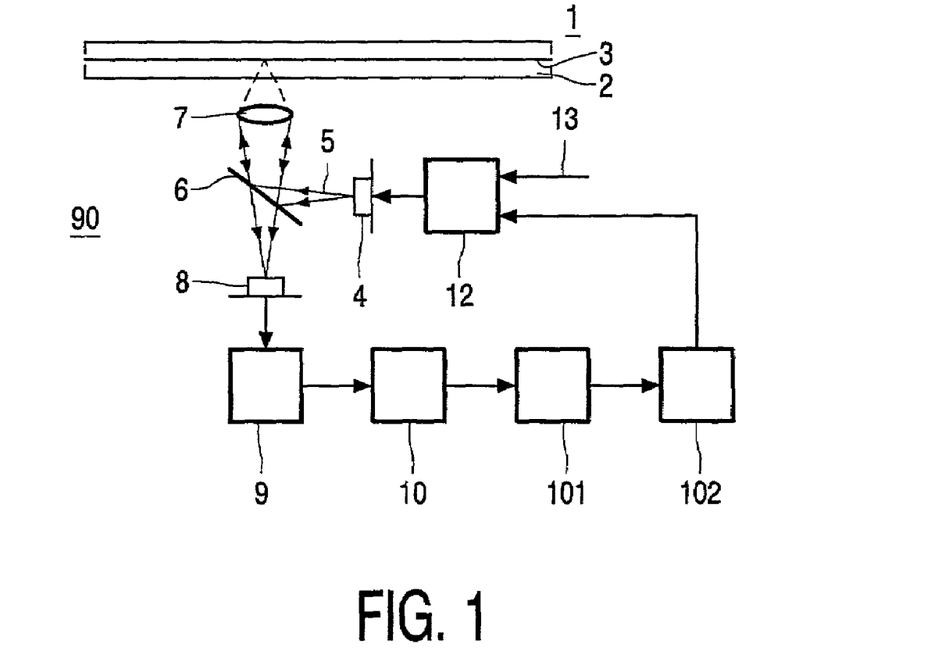
FIG. 1 is a schematic block diagram of an embodiment of an optical recording apparatus according to the invention.

FIG. 1 shows an optical recording apparatus and an optical recording medium 1 according to the invention. The recording medium 1 has a transparent substrate 2 and a recording layer 3 arranged on it. The recording layer 3 comprises a material suitable for recording information by means of a radiation beam 5. The recording material may be of, for example, the magneto optical type, the phase-change type, the dye type or any other suitable material. Information may be recorded in the form of optically detectable regions, also called marks, on the recording layer 3. The apparatus comprises a radiation source 4, for example, a semiconductor laser, for emitting a radiation beam 5. The radiation beam is converged on the recording layer 3 via a beam splitter 6, an objective lens 7 and the transparent substrate 2. The recording medium 1 may alternatively be air incident, the radiation beam then being directly incident on recording layer 3 without passing through a transparent substrate. Radiation reflected from the medium 1 is converged by the objective lens 7 and, after passing through the beam splitter 6, falls on a detection system 8 for converting the incident radiation into the electric detector signals. The detector signals are applied to a circuit 9. The circuit 9 derives several signals from the detector signals, such as a read signal $S_R$ representing the information being read from the recording medium 1. The radiation source 4, the beam splitter 6, the objective lens 7, the detection system 8 and circuit 9 together form a read unit 90.

The read signal from the circuit 9 is processed in a first processor 10 in order to derive signals representing a read parameter from the read signal. The derived signals are fed to a second processor 101 and, subsequently, to a third processor 102, the second and third processors processing a series of values of the read parameter and deriving therefrom a value for a write power control signal necessary for controlling the laser power level.

The write power control signal is applied to a control unit 12. An information signal 13, representing the information to be recorded on the recording medium 1, is also fed to the control unit 12. The output of the control unit 12 is connected to the radiation source 4. A mark on the recording layer 3 can be recorded by a single radiation pulse, the power of which is determined by the optimum write power level ($P_{opt}$) as determined by the third processor 102. Alternatively, a mark can also be recorded by a series of radiation pulses of equal or different length and one or more power levels determined by the write power signal.

A processor is understood to mean any means suitable for performing calculations, for example, a microprocessor, a digital signal processor, a hard-wired analog circuit or a field programmable circuit. Moreover, the first processor 10, the second processor 101 and third the processor 102 may be separate devices or, alternatively, may be combined into a single device executing all three processes.

Before recording information on the medium 1, the apparatus sets its write power (P) to the optimum value ($P_{opt}$) by performing a method according to the invention. This method is schematically depicted in the flowchart shown in FIG. 4.

Figure 4:
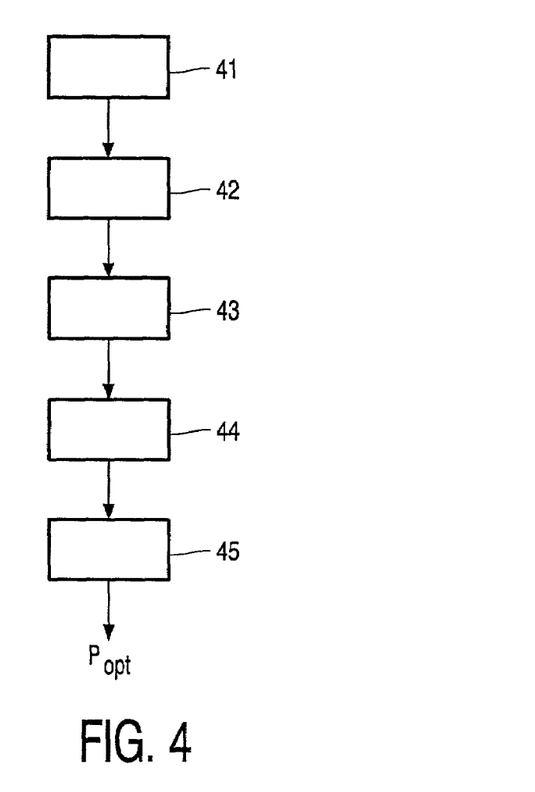
FIG. 4 is a flowchart of a first version of the method according to the invention.

In a first step 41, the apparatus writes a series of test patterns on the medium 1. The test patterns should be selected so as to give a desired read signal. If the read parameter to be derived from the read signal is the modulation (M) of a read signal portion pertaining to a test pattern, the test pattern should comprise marks sufficiently long to achieve a maximum modulation of the read signal portion. When the information is coded according to the so-called Eight-to-Fourteen Modulation (EFM), the test patterns preferably comprise the long I11 marks of the modulation scheme. When the information is coded according to the Eight-to-Fourteen Plus Modulation (EFM+), the test patterns should comprise the long I14 marks of this modulation scheme. Each test pattern is recorded with a different write power level (P). The range of powers can be selected on the basis of an indicative power level ($P_{ind}$) recorded as control information on the recording medium. Subsequent test patterns may be recorded with a step-wise increased write power level (P) under the control of the control unit 12. The test patterns may be written anywhere on the recording medium. They can alternatively be written in specially provided test areas on the recording medium.

Figure 2:
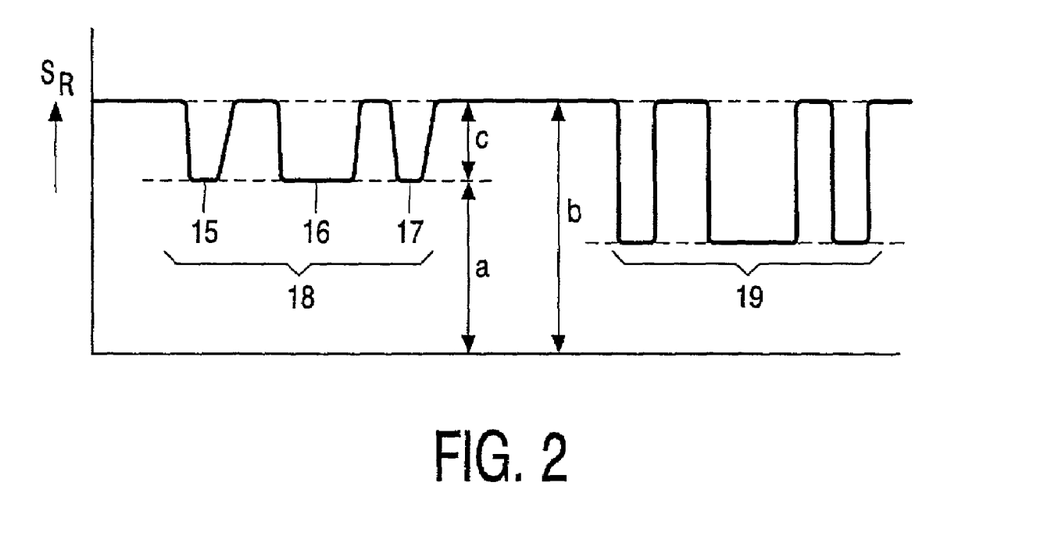
FIG. 2 illustrates two read signal portions from two test patterns.

In a second step 42, the recorded test patterns are read by the read unit 90 so as to form a read signal $S_R$. FIG. 2 shows the read signal portions 18 and 19 obtained from two test patterns written at two different write power levels. The patterns shown comprise a short mark, a long mark and a short mark, as denoted by the signal parts 15, 16 and 17, respectively, in both the read signal portion 18 and the read signal portion 19. An actual pattern may comprise a few hundred marks of different or equal length.

In a third step 43, the processor 101 derives, from the read signal $S_R$, a read parameter for each read signal portion. A possible read parameter is the ratio of the lowest level of the amplitude of a read signal portion (for reading the signal portion 18 indicated by 'a' in FIG. 2) to the maximum level of the amplitude of the same read signal portion (indicated by 'b'). A preferred read parameter is the modulation (M), being the ratio of the maximum peak-to-peak value of a read signal, indicated by 'c', to the maximum amplitude 'b' of the read signal portion.

In a fourth step 44, the processor 101 forms a series of value pairs for the modulation (M) of a pattern times the write power (P) against the write power (P) with which that pattern has been written. The write powers can be taken from the value of the write power control signal during the recording of the test patterns or, alternatively, from a measurement of the radiation power.

Figure 3:
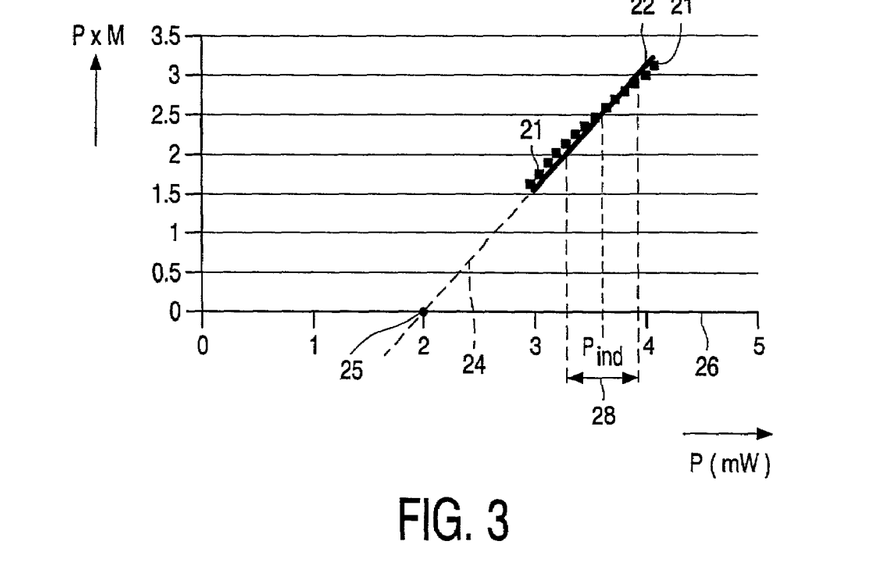
FIG. 3 is a graph showing the measured modulation times the write power as a function of the write power and the curve-fitted function.

FIG. 3 shows, schematically, the result of the processed read signal obtained from the test patterns, wherein each dot 21 represents a pair of values for the modulation (M) times the write power (P) against the write power (P) of a test pattern. The processor 101 fits a straight line 22 through the measured modulation values (M) times the write power (P), i.e., M·P. The fitted straight line is represented in FIG. 3 by a solid line 22. The fitting may be done by the well-known least-squares fitting algorithm. The straight line 22 is curve-fitted to the dots 21 in a predetermined fit range 28 of write power levels. In this example, the fit range is centered around a value $P_{ind}$ indicative of the fit range read from an area on the recording medium. The fitted straight line 22 may be extrapolated. The extrapolated straight line is represented in FIG. 3 by a dashed line 24.

In a fifth step 45, the processor 102 determines an analytic expression describing the fitted straight line. This expression is of the form:

$$P \cdot M = \alpha \cdot (P - \beta),$$

where the parameters $\alpha$ and $\beta$ have values resulting from the curve-fitting. The value for the write parameter $\beta$ determined by the curve fitting is now used by the processor 102 to set the optimum value ($P_{opt}$) for the write power (P). This is done by multiplying this value for the write parameter $\beta$ by a value of a multiplication constant ($\kappa$). Hence, the optimum value ($P_{opt}$) for the write power (P) is found from:

$$P_{opt} = \kappa \cdot \beta.$$

The multiplication constant ($\kappa$) depends on properties of the recording medium 1 and may be pre-recorded in a control area 32 of the recording medium 1. If so, the multiplication constant ($\kappa$) is read from the recording medium 1 by the read unit 90.

It should be mentioned that the value for the write parameter $\beta$ determined by the curve fitting corresponds to the value of the write power (P) for which the extrapolated straight line 24 crosses the P-axis 26. This value of the write power (P), and hence of the write parameter $\beta$, is denoted by reference number 25 in FIG. 3.

Figure 6:
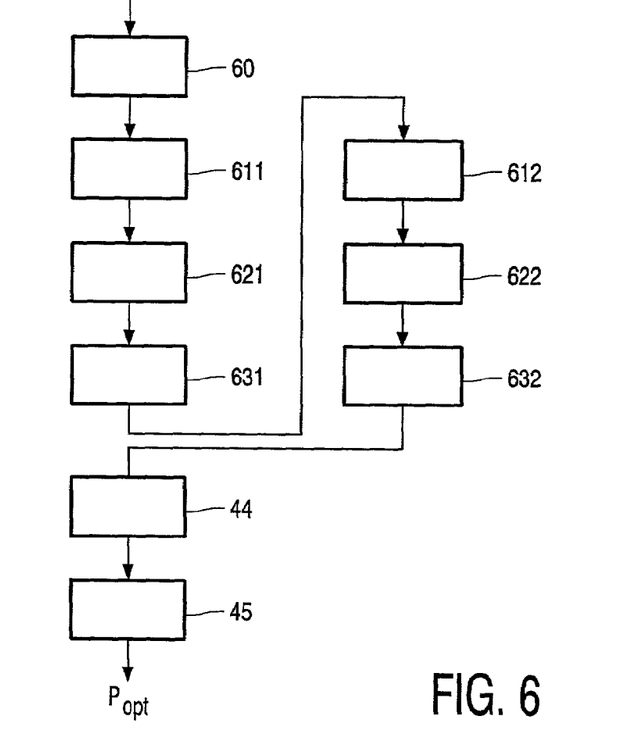
FIG. 6 is a flowchart of a procedure for setting the predetermined fit range.

An example of a procedure for setting the predetermined fit range 28 of write power levels in an iterative manner is schematically depicted in the flowchart shown in FIG. 6. In a step 60, a value $P_{ind}$, indicative of the fit range, is read from an area on the recording medium 1. In step 611, an initial fit range is set from $0.85 \cdot P_{ind}$ to $1.15 \cdot P_{ind}$. In a next step 621, a first provisional straight line is curve-fitted to the dots 21 in the initial fit range. From this first provisional straight line, a first fit value $P_{fit,1}$ is derived in step 631. In a next sequence of the iteration procedure, the fit range is set in step 612 from $0.85 \cdot P_{fit,1}$ to $1.15 \cdot P_{fit,1}$. In step 622, again a provisional straight line is curve-fitted to the dots 21 and from this second provisional straight line, a second fit value $P_{fit,2}$ is derived in step 632. Now, in step 44, a straight line 22 is curve fitted to the dots 21 in a predetermined fit range 28 set from $0.85 \cdot P_{fit,2}$ to $1.15 \cdot P_{fit,2}$.

Each fit value $P_{fit,N}$ is derived from the N-th provisional curve-fitted straight line. A suitable value $P_{fit,N}$ is found from:

$$P_{fit,N} = (\kappa \cdot \beta_N)/\rho,$$

where $\beta_N$ corresponds to the value of the write power (P) for which the extrapolated N-th provisional straight line crosses the P-axis 26. Moreover, the fit value $P_{fit,N}$ may be derived not only from the N-th provisional straight line, but also from fit values in earlier steps of the iteration procedure, i.e.:

$$P_{fit,N} = f((\kappa \cdot \beta_N)/\rho), P_{ind}, P_{fit,N-1}, P_{fit,N-2}, \ldots).$$

Particularly attractive values for values for $P_{fit,1}$ and $P_{fit,2}$ are found to be:

$$P_{fit,1} = (P_{ind} + (\kappa \cdot \beta_1)/\rho)/2, \text{ and}$$

$$P_{fit,2} = (P_{fit,1} + (\kappa \cdot \beta_2)/\rho)/2.$$

In the above example, the iteration procedure consists of three iteration steps. It is to be noted, however, that any other number of iteration steps may be used. Moreover, besides using a fixed number of iteration steps, the iteration procedure may, alternatively, continue until a stop criterion is reached. Such a stop criterion is, for example, that $P_{fit}$ changes less than a predetermined value between two consecutive iteration steps.

Figure 7:
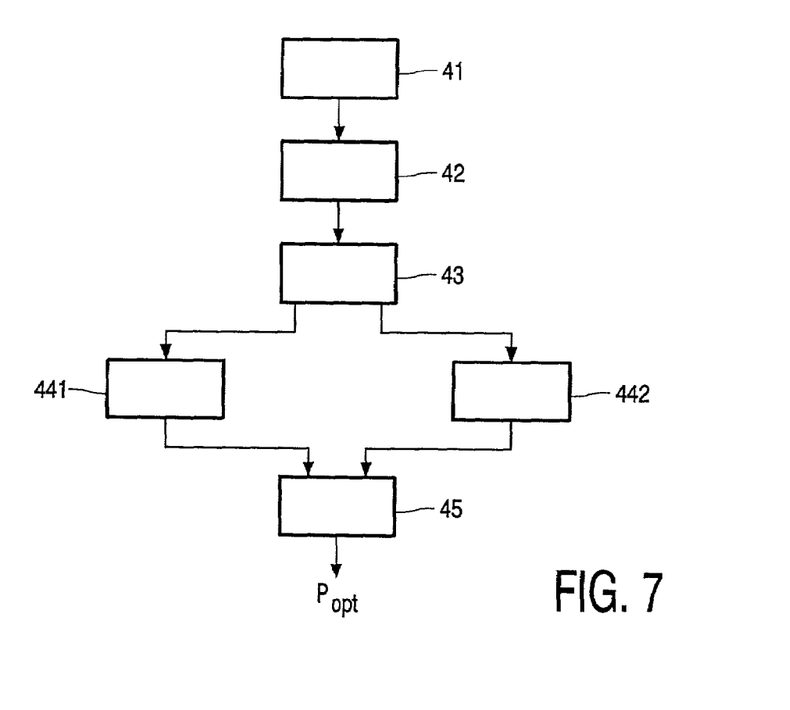
FIG. 7 is a flowchart of a second version of the method according to the invention.

FIG. 7 shows, schematically, a flowchart of a second version of the method according to the invention. Instead of curve fitting a single straight line in the fourth step 44 of the method, two straight lines are curve-fitted. In step 441, a first straight line is curve fitted in a first predetermined fit range and, in step 442, a second straight line is curve fitted in a second predetermined fit range. The first fit range is centered around $P_{ind}$–0.5 mW while the second fit range is centered around $P_{ind}$+0.5 mW. Alternatively, other ranges may be used. The first curve-fitted straight line is described by the expression $P \cdot M = \alpha_1 \cdot (P - \beta_1)$, while the second curve-fitted straight line is described by the expression $P \cdot M = \alpha_2 \cdot (P - \beta_2)$. In the fifth step 45 of the method, the optimum value ($P_{opt}$) for the write power is dependent on both $\beta_1$ and $\beta_2$. For example, $P_{opt}$ may be derived from the mean value of $\beta_1$ and $\beta_2$, i.e.:

$$P_{opt} = k \cdot (\beta_1 + \beta_2)/2.$$

Alternatively, $P_{opt}$ may be derived from a linear interpolation between $\beta_1$ and $\beta_2$ while taking into account the respective fit ranges.

Figure 5A:
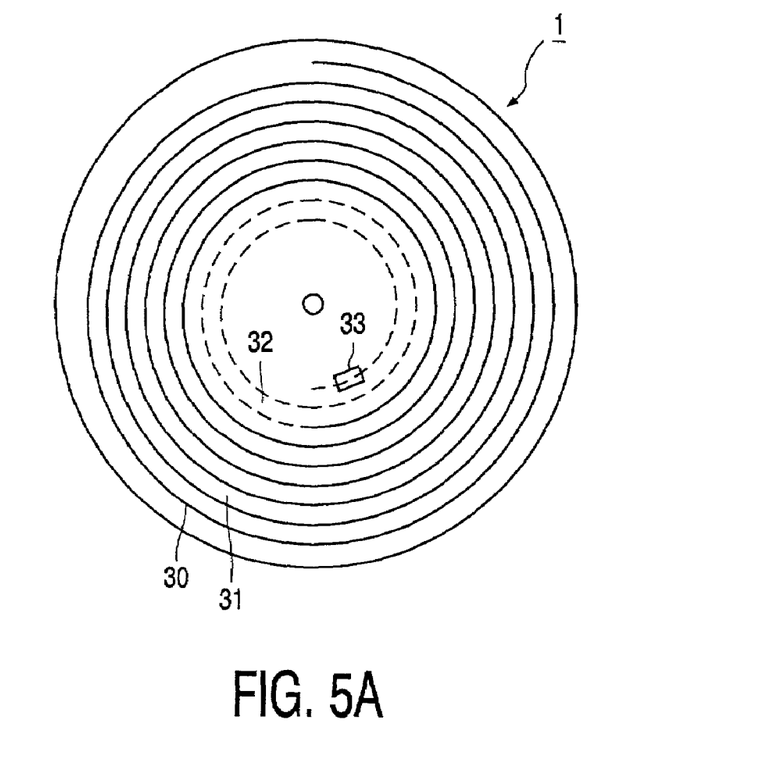
FIGS. 5A and 5B show an embodiment of a recording medium according to the invention.

FIG. 5A shows an embodiment of recording medium 1 provided with a track 30. The track may have a circular or spiral shape and in the form of, for example, an embossed groove or ridge. The area of the recording medium is divided in an information recording area 31 for recording user information and a control area 32 for storing information relevant for writing, reading and erasing information on the recording medium and, in general, not intended for recording user information. The control area 32 is marked by a dashed track in FIG. 5A. The information recording area 31 is of a type which is subject to change as regards an optically detectable property when exposed to radiation beyond a specific write power level. Information on the recording medium is represented by patterns of marks.

Figure 5B:
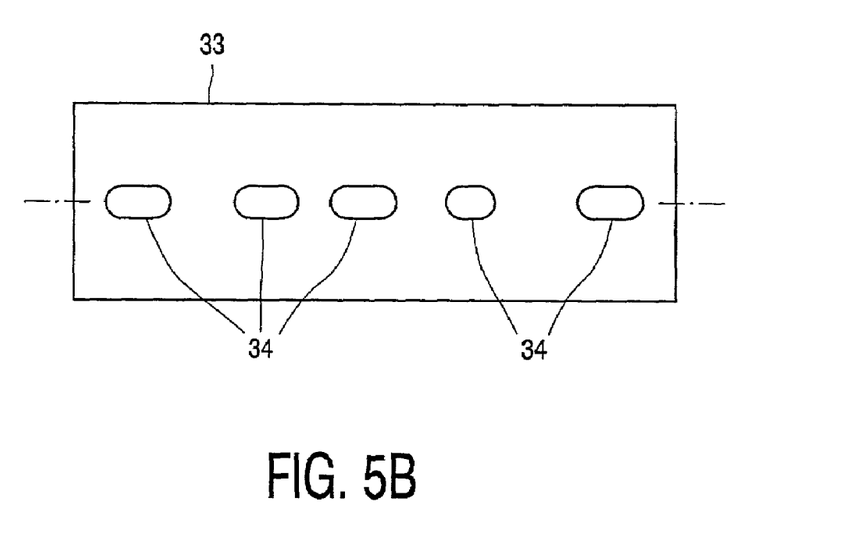

Information is recorded in a track 30 in the information recording area 31 by a recording process in which each mark is formed by one ore more recording pulses of constant or varying write power in dependence on, for example, the length of the marks to be recorded. The recording parameters for this recording process are stored in the control area 32 in the form of patterns of marks 34 representing the control information indicative of the recording process. FIG. 5B shows a strongly enlarged portion 33 of the track 30 comprising an example of a pattern of marks 34 in which the control information is encoded.

The value of the multiplication constant $\kappa$ and the value indicative of the fit range $P_{ind}$ are stored as patterns of marks representing control information in the control area 32 of the recording medium 1. When the control area 32 is embossed, the manufacturer of the medium must pre-record the values for κ and $P_{ind}$ during manufacture. Alternatively, the user can record the value for κ on the recording medium during, for example, initialization of the recording medium.

Alternatively, a recording medium provided with control information in a different manner may be used. Such an alternative recording medium is, for example, a recording medium having the control information indicative of the recording process encoded in a periodic modulation of an embossed groove (known as a wobble). Now, the values for the multiplication constant κ and for the value indicative of the fit range $P_{ind}$ are coded in an auxiliary signal which is used, for example, to frequency-modulate the wobble. A description of such a recording medium may be found in European Patent Application No. EP 0 397 238, corresponding to U.S. Pat. Nos. 5,418,764 and 5,654,947.

It should be noted that the above mentioned versions and embodiments illustrate rather than limit the invention, and that those skilled in the art will be able to design alternatives without departing from the scope of the appended claims. For example, the invention has been explained on the basis of embodiments using the read signal modulation (M) as the read parameter and a disc-shaped recording medium. However, it will be clear to a person skilled in the art that alternative other read parameters and other shapes of the recording medium can be employed. The jitter of the read signal can, for example, alternatively be used as a read parameter. Moreover, any reference sign placed between parentheses in the claims shall not be construed as limiting the claim. The word "comprise" and its conjugations do not exclude the presence of steps or elements other than those listed in the claims.

The invention claimed is:

1. A method for setting an optimum value of a write parameter for use in an optical recording apparatus for writing information on an optical recording medium by means of a radiation beam, the method comprising the steps of:
   writing a series of test patterns on the recording medium, each pattern being written with a different value of a write power level (P) of the radiation beam;
   reading the patterns so as to form corresponding read signal portions; and
   deriving a value of a read parameter from each read signal portion,
characterized in that the method further comprises the steps of:
   curve-fitting a function defining a relation between the read parameter and the write power level (P) to the values of the read parameter and of the write power level (P); and
   setting an optimum value of the write parameter in dependence on a property of the curve-fitted function, characterized in that in the curve-fitting step, a function represented by a substantially straight line is curve-fitted to the values of the read parameter and of the write power level (P).

2. The method as claimed in claim 1, wherein the read parameter is a modulation (M) of the amplitude of a read signal derived from information recorded on the recording medium.

3. The method as claimed in claim 1, characterized in that the curve-fitting of the straight line in the curve-fitting step is carried out in a predetermined fit range of write power levels.

4. The method as claimed in claim 3, characterized in that the predetermined fit range of write power levels is between $P_{ind}$ times $\omega_1$ and $P_{ind}$ times $\omega_2$, where $P_{ind}$ is a value read from an area on the recording medium comprising control information indicative of the recording process, and where $\omega_1$ and $\omega_2$ are predetermined values.

5. The method as claimed in claim 4, characterized in that $\omega_1$ has a value substantially equal to 0.85 and $\omega_2$ has a value substantially equal to 1.15.

6. The method as claimed in claim 3, characterized in that the method further comprises a step of:
   curve-fitting a provisional straight line,
   and in that the predetermined fit range of write power levels is between $P_{fit}$ times $\omega_1$ and $P_{fit}$ times $\omega_2$, where $P_{fit}$ is a value derived from the provisional curve-fitted straight line, and where $\omega_1$ and $\omega_2$ are predetermined values.

7. The method as claimed in claim 3, characterized in that the method further comprises a step of:
   curve-fitting at least a second straight line in at least a second predetermined fit range of write power levels,
   and in that in the optimum value setting step, the optimum value of the write parameter is set in dependence on a property of each of the curve-fitted straight lines.

8. A method for setting an optimum value of a write parameter for use in an optical recording apparatus for writing information on an optical recording medium by means of a radiation beam, the method comprising the steps of:
   writing a series of test patterns on the recording medium, each pattern being written with a different value of a write power level (P) of the radiation beam;
   reading the patterns so as to form corresponding read signal portions;
   deriving a value of a read parameter from each read signal portion;
   curve-fitting a function defining a relation between the read parameter and the write power level (P) to the values of the read parameter and of the write power level (P); and
   setting an optimum value of the write parameter in dependence on a property of the curve-fitted function, characterized in that the read parameter is a modulation (M) of the amplitude of a read signal derived from information recorded on the recording medium,
   in that the curve-fitted function is of the form:

$$P \cdot M = \alpha \cdot (P - \beta),$$

wherein α and β have values resulting from the curve-fitting,
   and in that the optimum value of the write parameter is set to be substantially equal to the value of β.

9. A method for setting an optimum value ($P_{opt}$) of a write power level (P), of a radiation beam, said method being intended for use in an optical recording apparatus for writing information on an optical recording medium by the radiation beam (5) having the write power level (P), said method comprising the steps of:
   setting an optimum value of a write parameter using the method as claimed in any one of the claims 8 to 7; and
   setting the optimum value ($P_{opt}$) of the write power level (P) to be equal to the optimum value of the write parameter times a multiplication constant (κ).

10. The method as claimed in claim 9, characterized in that the multiplication constant (κ) is read from an area on the recording medium containing control information indicative of a recording process whereby information can be recorded on said recording medium.

11. An optical recording apparatus for recording information on an optical recording medium, said optical recording apparatus comprising:
- a radiation source for emitting a radiation beam having a controllable value of a write power level (P) for recording information on the recording medium;
- a control unit for recording a series of test patterns, each pattern being recorded with a different value of the write power level;
- a read unit for reading the patterns and for forming corresponding read signal portions; and
- first means for deriving a value of a read parameter from each read signal portion, characterized in that the optical recording apparatus further comprises:
- second means for curve-fitting a function defining a relation between the read parameter and the write power level (P) to the values of the read parameter and of the write power level (P); and
- third means for setting an optimum value of a write parameter in dependence on a property of the curve-fitted function, characterized in that the second means curve-fits a function represented by a substantially straight line to the values of the read parameter and of the write power level (P).

12. The optical recording apparatus as claimed in claim 11, characterized in that the second means for curve-fitting a function sets a predetermined fit range of power levels.

13. The optical recording apparatus as claimed in claim 12, wherein the read unit reads a value ($P_{ind}$) indicative of the fit range from an area on the recording medium comprising control information indicative of the recording process, characterized in that the second means sets the predetermined fit range of power levels between $P_{ind}$ times $\omega_1$ and $P_{ind}$ times $\omega_2$, where $\omega_1$ and $\omega_2$ are predetermined values.

14. An optical recording medium for having information recorded thereon by optical recording apparatus as claimed in claim 13, the recording medium comprising an area containing control information indicative of a recording process whereby information can be recorded on said recording medium, the control information comprising values of recording parameters for the recording process, characterized in that the control information comprises the value indicative of the fit range ($P_{ind}$).

15. The optical recording apparatus as claimed in claim 12, characterized in that the optical recording apparatus further comprises fourth means for curve-fitting a provisional straight line to the values of the read parameter and of the write power level (P), and fifth means for setting a value $P_{fit}$ in dependence on a property of the curve-fitted provisional straight line, and in that the second means sets the predetermined fit range of power levels between $P_{fit}$ times $\omega_1$ and $P_{fit}$ times $\omega_2$, where $\omega_1$ and $\omega_2$ are predetermined values.

16. The optical recording apparatus as claimed in claim 12, characterized in that the optical recording apparatus further comprises fourth means for curve-fitting a second straight line in a second predetermined fit range of power levels, and in that the third means sets an optimum value of the write parameter in dependence on a property of each of the curve-fitted straight lines.

17. The optical recording apparatus as claimed in claim 11, characterized in that the read parameter derived by the first means is a modulation (M) of the amplitude of a read signal derived from information recorded on the recording medium, and in that the curve-fitted function represented by a substantially straight line is of the form $P \cdot M = \alpha \cdot (P - \beta)$, wherein $\alpha$ and $\beta$ have values resulting from the curve-fitting.

18. The optical recording apparatus as claimed in claim 17, characterized in that the third means sets the optimum value of the write parameter so as to be substantially equal to the value of $\beta$.

19. The optical recording apparatus as claimed in claim 17, characterized in that the optical recording apparatus further comprises setting means for setting an optimum value ($P_{opt}$) of the write power level (P) in dependence on the optimum value of the write parameter.

20. The optical recording apparatus as claimed in claim 19, wherein the read unit reads a value of a multiplication constant ($\kappa$) from an area on the recording medium containing control information indicative of a recording process whereby information can be recorded on said recording medium, characterized in that the setting means sets an optimum value ($P_{opt}$) of the write power level (P) by multiplying the optimum value of a write parameter by the multiplication constant ($\kappa$).

21. An optical recording medium for having information recorded thereon by optical recording apparatus as claimed in claim 20, the recording medium comprising an area containing control information indicative of a recording process whereby information can be recorded on said recording medium, the control information comprising values of recording parameters for the recording process, characterized in that the control information comprises the value of the multiplication constant ($\kappa$).

* * * * *